US012598681B2

(12) United States Patent
Pastor et al.

(10) Patent No.: US 12,598,681 B2
(45) Date of Patent: Apr. 7, 2026

(54) APPARATUS TO COMMUNICATE UPSTREAM INFORMATION TO A HOST VIA A LIGHT-EMITTING DIODE (LED) CONTROLLER

(71) Applicant: MICROCHIP TECHNOLOGY INCORPORATED, Chandler, AZ (US)

(72) Inventors: Marta Pastor, Madrid (ES); Ivan Gonzalez, Las Rozas de Madrid (ES)

(73) Assignee: Microchip Technology Inc., Chandler, AZ (US)

(*) Notice: Subject to any disclaimer, the term of this patent is extended or adjusted under 35 U.S.C. 154(b) by 170 days.

(21) Appl. No.: 18/492,336

(22) Filed: Oct. 23, 2023

(65) Prior Publication Data

US 2024/0381505 A1 Nov. 14, 2024

Related U.S. Application Data

(60) Provisional application No. 63/465,048, filed on May 9, 2023.

(51) Int. Cl.
*H05B 45/325* (2020.01)
*H05B 45/37* (2020.01)
*H05B 47/14* (2020.01)

(52) U.S. Cl.
CPC .......... *H05B 45/325* (2020.01); *H05B 45/37* (2020.01); *H05B 47/14* (2020.01)

(58) Field of Classification Search
CPC ...... H05B 45/325; H05B 45/37; H05B 47/14; H05B 45/20; H05B 47/18
See application file for complete search history.

(56) References Cited

U.S. PATENT DOCUMENTS 9,374,855 B2 * 6/2016 Siessegger ............ H04B 3/548
2013/0099702 A1 * 4/2013 Williams ............... H05B 45/48 315/363
2015/0115809 A1 * 4/2015 Siessegger ............ H05B 45/48 315/291

(Continued)

FOREIGN PATENT DOCUMENTS

CN 102625944 B * 10/2015 ............... G09G 3/22

OTHER PUBLICATIONS

International Search Report and Written Opinion, International Searching Authority, European Patent Office, Jul. 22, 2024, PCT/US2024/028155.

(Continued)

*Primary Examiner* — Abdullah A Riyami
*Assistant Examiner* — Syed M Kaiser
(74) *Attorney, Agent, or Firm* — Shumaker, Loop & Kendrick, LLP; Ryan M. Corbett

(57) ABSTRACT

An apparatus is provided that includes a controlled voltage source and processing circuitry. The controlled voltage source connects to one or more light-emitting diode (LED) leads of a light-emitting diode (LED) controller that is in communication with a host. The processing circuitry selects a particular one of a plurality of predetermined voltages based on upstream information to be communicated to the host. The processing circuitry causes the controlled voltage source to impose the particular one of the plurality of predetermined voltages on the one or more LED leads, and thereby communicate the upstream information to the host via the LED controller.

22 Claims, 15 Drawing Sheets

(56) References Cited

U.S. PATENT DOCUMENTS

| | | | | |
|---|---|---|---|---|
| 2015/0373811 | A1 | 12/2015 | Dunser et al. | |
| 2019/0246463 | A1* | 8/2019 | Williams | H05B 45/397 |
| 2019/0320515 | A1* | 10/2019 | Sadwick | F21V 23/0471 |
| 2021/0211156 | A1* | 7/2021 | Kessler | H04B 1/713 |
| 2021/0265917 | A1* | 8/2021 | Malone | H02J 7/007 |

OTHER PUBLICATIONS

"Smart LED Driver & Controller", Datasheet, Inova Semiconductors GmbH, 2021, pp. 1-35.
"ISELED Communication Protocol—Control Commands", Inova Semiconductors, 2020, pp. 1-46.
"Smart LED Driver & Controller", Preliminary Datasheet, Inova Semiconductors, 2019, pp. 1-32.
Neumann et al., "ISELED—A Bright Future for Automotive Interior Lighting", ISELED, Oct. 2017, pp. 1-7.
Hoffman, "The Bus for ISELED, Sensors and Actuators", Automobile Elektronik, Feb. 2022, pp. 18-21.

* cited by examiner

APPARATUS TO COMMUNICATE UPSTREAM INFORMATION TO A HOST VIA A LIGHT-EMITTING DIODE (LED) CONTROLLER

CROSS-REFERENCE TO RELATED APPLICATION(S)

The present application claims priority to U.S. Provisional Patent Application No. 63/465,048, entitled: Input/output (I/O) Device for a Light-Emitting Diode (LED) Lighting System, filed on May 9, 2023, the content of which is hereby incorporated by reference in its entirety.

TECHNOLOGICAL FIELD

The present disclosure relates generally to electronic communication and, in particular, to an apparatus to communicate with a host via a light-emitting diode (LED) controller.

BACKGROUND

Light-emitting diodes (LEDs) are semiconductor devices that convert electrical energy into light. They were first developed in the early 1960s and have become an increasingly popular form of lighting in recent decades due to their energy efficiency, durability, and long life span. LEDs are now used in a wide variety of applications, ranging from single LEDs used in small electronics to vehicle LED lighting systems used in cars and trucks.

Vehicle LED lighting systems in particular are becoming increasingly popular in cars and trucks due to their efficiency, durability, and long life span. These systems are designed to provide a brighter, more uniform light than traditional incandescent bulbs. LED lighting systems are also more energy efficient, reducing fuel consumption and emissions.

One of the most advanced LED lighting systems is ISELED (Intelligent Smart Embedded LED), which is designed for use in vehicles. ISELED is a modular system that includes interconnected LED modules, which may be arranged on light strips. Each LED module (at times referred to as an ISELED device) is a system-in-package (SIP) solution that combines a number of LEDs with an LED driver and a controller in a single package. The LED modules in ISELED enable individual control of LEDs, which in turn allows for the creation of complex lighting patterns.

An extension of ISELED is the ILaS (ISELED Light and Sensor) network that allows for communication between arrangements of interconnected LED modules and a central controller. The ILaS enables dynamic and synchronized lighting effects across greater numbers of LED modules.

LED lighting systems such as ISELED and ILaS are becoming more present in the automotive interior lighting industry, also increasing the demand for additional functionalities such as sensors, touch sensors, and white LEDs, without limitation. However, there are little to no solutions to implement additional functionality in ISELED/ILaS other than the lighting control itself. It would therefore be desirable to have a system and method that enables added functionality in an LED lighting system.

BRIEF SUMMARY

Example implementations of the present disclosure generally relate to electronic communication and, in particular, to an apparatus to communicate with a host via a light-emitting diode (LED) controller. The present disclosure includes, without limitation, the following example implementations.

Some example implementations provide an apparatus comprising: a controlled voltage source to connect to one or more light-emitting diode (LED) leads of a light-emitting diode (LED) controller that is in communication with a host; and processing circuitry to: select a particular one of a plurality of predetermined voltages based on upstream information to be communicated to the host; and cause the controlled voltage source to impose the particular one of the plurality of predetermined voltages on the one or more LED leads, and thereby communicate the upstream information to the host via the LED controller.

Some example implementations provide a method comprising: selecting a particular one of a plurality of predetermined voltages based on upstream information to be communicated to a host in communication with a light-emitting diode (LED) controller, the LED controller including one or more LED leads connected to a controlled voltage source; and causing the controlled voltage source to impose the particular one of the plurality of predetermined voltages on the one or more LED leads, and thereby communicating the upstream information to the host via the LED controller.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

DETAILED DESCRIPTION

Figure 1:
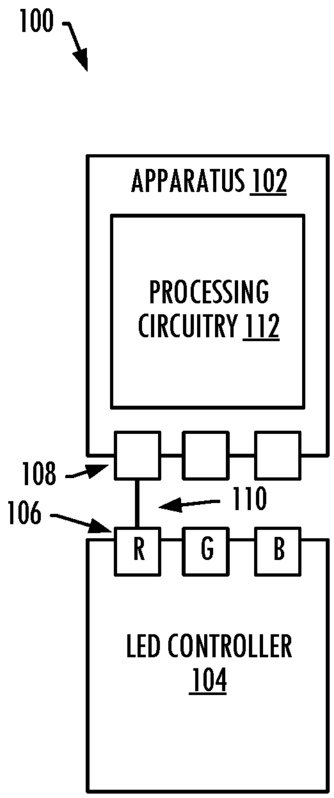
FIG. 1 illustrates a system including an apparatus connectable to a light-emitting diode (LED) controller, according to some example implementations of the present disclosure.

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. Like reference numerals refer to like elements throughout.

Unless specified otherwise or clear from context, references to first, second or the like should not be construed to imply a particular order. A feature described as being above another feature (unless specified otherwise or clear from context) may instead be below, and vice versa; and similarly, features described as being to the left of another feature else may instead be to the right, and vice versa. Also, while reference may be made herein to quantitative measures, values, geometric relationships or the like, unless otherwise stated, any one or more if not all of these may be approximate to account for acceptable variations that may occur, such as those due to engineering tolerances or the like.

As used herein, unless specified otherwise or clear from context, the "or" of a set of operands is the "inclusive or" and thereby true if one or more of the operands is true, as opposed to the "exclusive or" which is false when all of the operands are true. Thus, for example, "[A] or [B]" is true if [A] is true, or if [B] is true, or if both [A] and [B] are true. Further, the articles "a" and "an" mean "one or more," unless specified otherwise or clear from context to be directed to a singular form. Furthermore, it should be understood that unless otherwise specified, the terms "data," "content," "digital content," "information," and similar terms may be at times used interchangeably.

Example implementations of the present disclosure relate generally to electronic communication and, in particular, to an apparatus to communicate with a host via a light-emitting diode (LED) controller. Example implementations will be primarily described in the context of ISELED, but it should be understood that example implementations may equally apply to any of a number of other LED lighting systems.

FIG. 1 illustrates a system 100 including an apparatus 102 connectable to a light-emitting diode (LED) controller 104, according to some example implementations of the present disclosure. The LED controller 104 includes one or more LED leads 106 designed to connect the LED controller to one or more LEDs so as to drive the one or more LEDs to produce light in a controlled manner. In this regard, the LED controller 104 may produce a pulse-width modulation (PWM) signal designed to control the one or more LEDs to implement an LED operation. The LED leads 106 are labeled R, G, B for respectively a red LED, a green LED and a blue LED. The LED controller 104 may include greater or fewer LED leads 106 for more or less LEDs, which may be of any of a number of different colors.

The apparatus 102 includes one or more leads 108 to connect the apparatus 102 to the one or more LED leads 106 of the LED controller 104, and thereby connect the apparatus 102 to the LED controller 104. In this manner, a communication link 110 may be established between the apparatus 102 and the LED controller 104. In some examples, the apparatus 102 may implement an input/output (I/O) device. One particular example of a suitable apparatus is a microcontroller, and example of a suitable microcontroller is the PIC16F18075 microcontroller from Microchip Technology Inc., of Chandler, Arizona. Other examples of a suitable apparatus include, without limitation, digital signal controllers (DSCs), digital signal processors (DSPs), and application-specific integrated circuits (ASICs).

According to some example implementations, the apparatus 102 also includes processing circuitry 112 to receive a PWM signal from the LED controller 104, such as via the communication link 110. The processing circuitry 112 may decode the PWM signal to recover downstream information from the PWM signal, and perform an operation based on the downstream information, i.e. the recovered downstream information. The operation may be different from the LED operation, which may add functionality to the system 100, such as functionality related to integrated analog, timing and measurement, waveform control, user interface, communication and connectivity, system flexibility, and safety and monitoring, without limitation.

Figure 2:
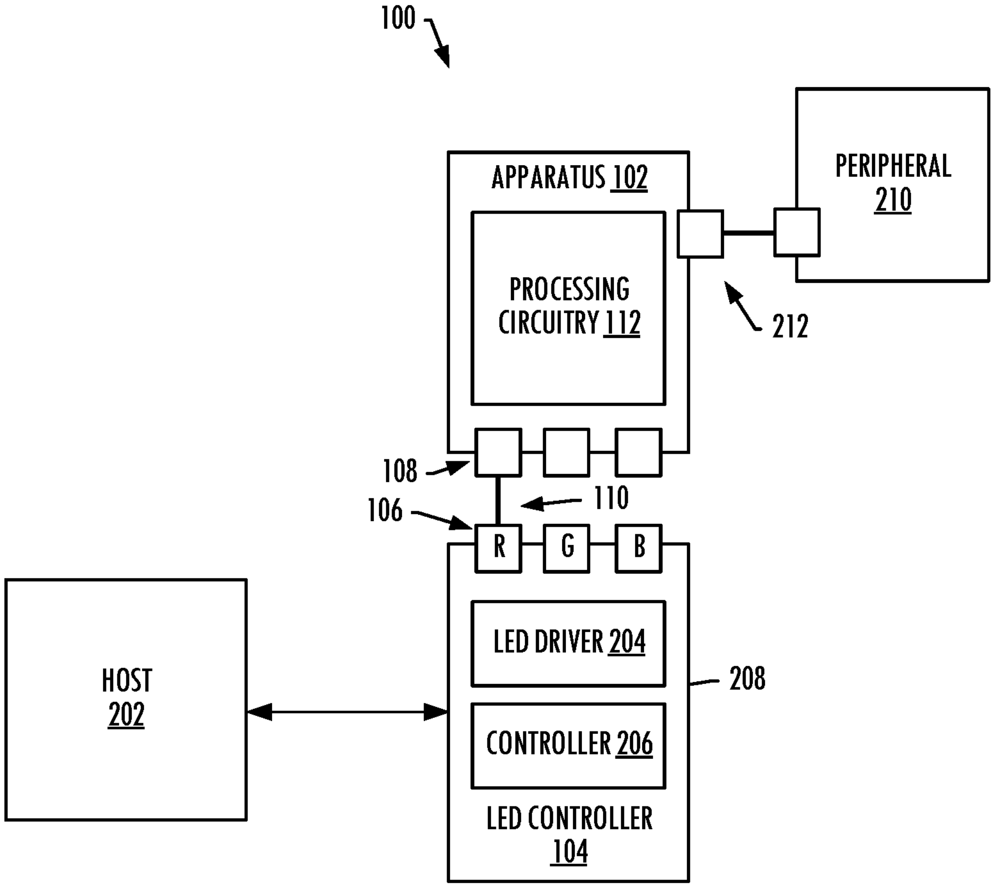
FIG. 2 illustrates the LED controller in communication with a host, and the apparatus connected to a peripheral device, according to some example implementations.

As shown in FIG. 2, in some examples, the LED controller 104 may be in communication with a host 202. In some examples, the host 202 may map the downstream information to a command designed to implement an LED operation. In some of these examples, the LED controller 104 may receive the command from the host, produce the PWM signal based on the command, and send the PWM signal to the apparatus 102 (e.g., via the communication link 110). To produce the PWM signal, the LED controller 104 may determine at least one of a duty cycle or a frequency based on the command, and produce the PWM signal based on the at least one of the duty cycle or the frequency. More particularly, for example, the LED controller 104 may determine one or more of the duty cycle and the frequency based on the downstream information, produce a pulsing signal having the frequency, and modulate a pulse width of the pulsing signal to produce the PWM signal having the duty cycle. In one example the frequency is fixed, and only the pulsed width is modulated so as to produce a signal with a duty cycle reflective of the downstream information. In one example, the duty cycle is fixed, and only the frequency is modulated so as to produce a signal with a frequency reflective of the downstream information.

In some examples, the LED controller 104 includes an LED driver 204, a controller 206, and a package 208 in which the LED driver 204 and the controller 206 are enclosed. In some of these examples, the LED driver 104 is connected to the one or more LED leads 106. The controller 206 of the LED controller 104 may receive the command from the host 202, produce the PWM signal based on the command, and cause the LED driver 204 to send the PWM signal to the apparatus 102 (e.g., via the communication link 110). One example of a suitable LED controller 104 is the model INLC10AQ ISELED driver and controller, available from Inova Semiconductors of Munich, Germany.

As more generally described above, to produce the PWM signal, the controller 206 may determine at least one of a duty cycle or a frequency based on the command, and produce the PWM signal based on the at least one of the duty cycle or the frequency. In a more specific example, the controller 206 may determine the duty cycle and the frequency based on the downstream information, produce a signal having the determined frequency, and modulate a pulse width of the signal having the determined frequency to produce the PWM signal having the duty cycle.

On the apparatus 102, to decode the PWM signal, the processing circuitry 112 may determine at least one of a duty cycle or a frequency of the PWM signal, and map the at least one of the duty cycle or the frequency to the downstream information. In a more specific example, the processing circuitry 112 may determine the duty cycle and the frequency of the PWM signal, and map the duty cycle and the frequency to the downstream information.

As also shown in FIG. 2, in some examples, the apparatus 102 may connect to a peripheral device 210 that is external to the apparatus, such as by another lead 212 of the apparatus 102. To perform the operation, then, the processing circuitry 112 may interact with the peripheral device 210 based on the downstream information (recovered from the PWM signal from the LED controller 104). In this regard, the processing circuitry 112 may perform a configuration or calibration of the peripheral device 210, perform a firmware update of the peripheral device 210, or both. Some examples of a suitable peripheral device 210 include, without limitation, a LED, an actuator, a sensor, or a communication interface (e.g., Bluetooth® device, Wi-Fi™ device).

In some examples the peripheral device 210 may include an LED such as a white LED. To interact with the peripheral device 210, then, the processing circuitry 112 of the apparatus 102 may control the LED of the peripheral device 210 to emit light (e.g., a white light).

In other examples, the peripheral device 210 may include an actuator (e.g., relay, motor) to produce a motion, and the processing circuitry 112 of the apparatus 102 may control the actuator of the peripheral device 210 to produce the motion. Similarly, in some examples, the peripheral device 210 may include a sensor (e.g., touch sensor, temperature sensor, humidity sensor, pressure sensor) to produce an output signal responsive to a physical stimulus or change in an environment of the sensor, and the processing circuitry 112 may read the output signal from the sensor of the peripheral device 210. In some of these examples, as explained further below, the processing circuitry 112 may communicate information about the output signal to the LED controller 104 or to the host 202 via the LED controller 104. Similarly, in some examples in which the LED controller 104 is in communication with the host 202, the processing circuitry 112 may communicate an acknowledgement of the downstream information (recovered from the PWM signal) to the host 202 via the LED controller 104.

Figure 3:
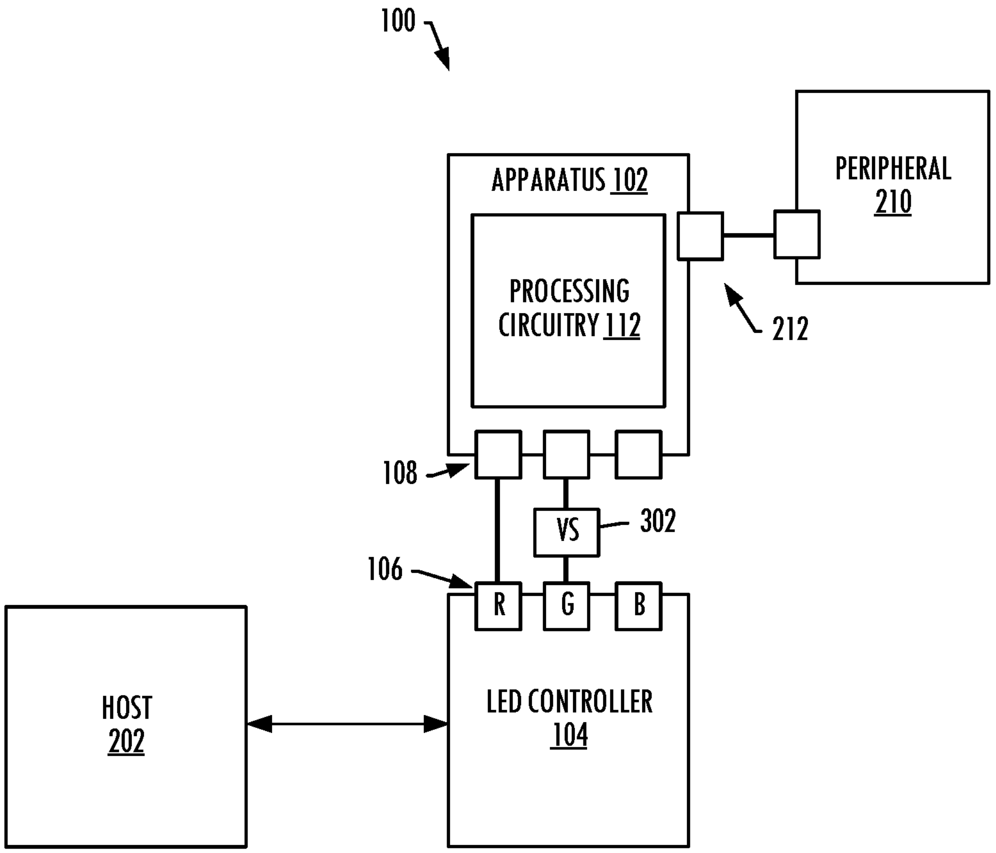
FIG. 3 illustrates the system including a controlled voltage source to enable the apparatus to communicate upstream, according to some example implementations.
Figure 4:
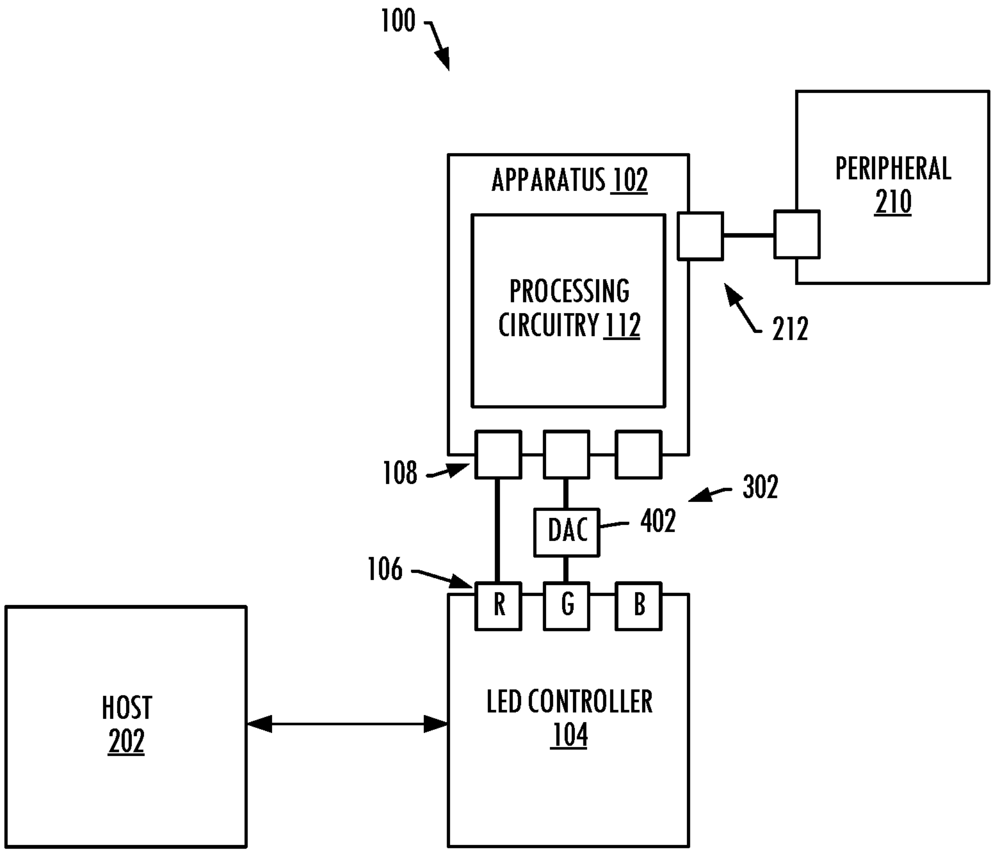
FIG. 4 illustrates the system of FIG. 3 in which the controlled voltage source is implemented as a digital-to-analog converter (DAC), according to some example implementations.
Figure 5:
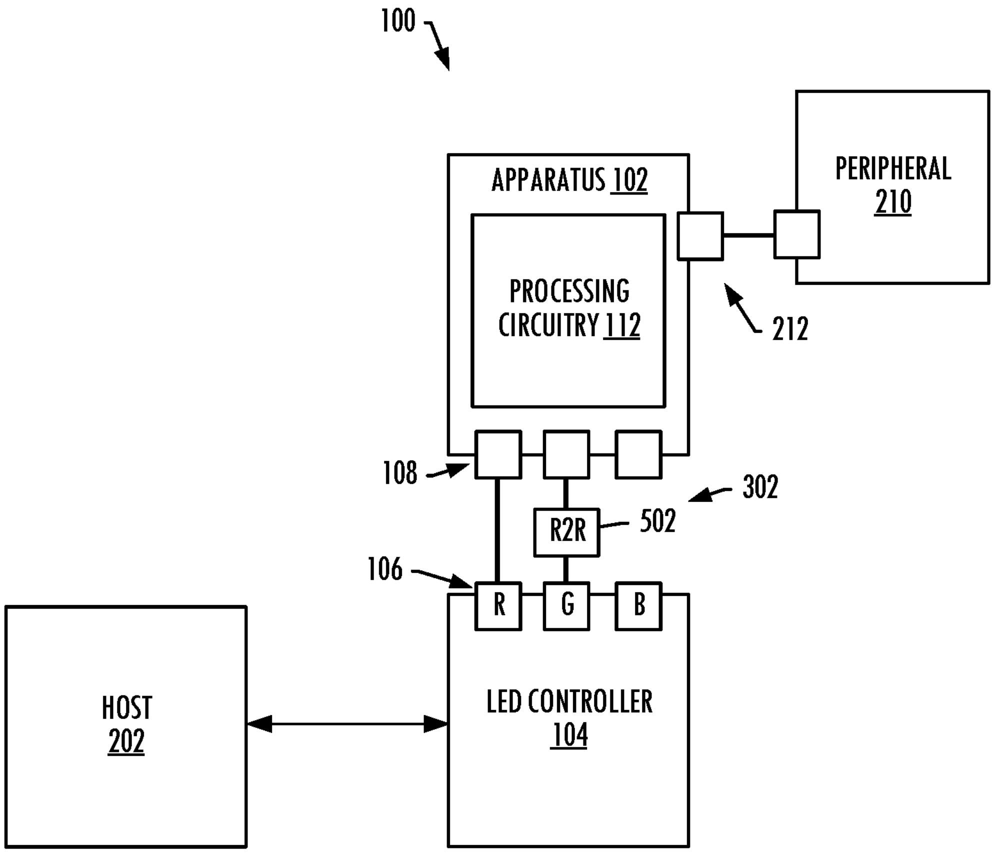
FIG. 5 illustrates the system of FIG. 3 in which the controlled voltage source is implemented as a resistor ladder, according to some example implementations.

As described above, the host 202 may communicate downstream to the apparatus 102 via the LED controller 104. Additionally or alternatively, in some examples, the apparatus 102 may communicate upstream to the host 202 via the LED controller 104. FIG. 3 illustrates the system 100 including a controlled voltage source (VS) 302 to enable the apparatus 102 to communicate upstream, according to some example implementations. As shown in FIGS. 4 and 5, respectively, examples of a suitable controlled voltage source 302 include, without limitation, a digital-to-analog converter (DAC) 402 or a resistor ladder (R2R) 502. Returning to FIG. 3, at least one of the one or more leads 108 of the apparatus 102 may connect the apparatus 102 to the controlled voltage source 302, and the controlled voltage source 302 may be connected to at least one of the one or more LED leads 106 of the LED controller 104. In other examples, the apparatus 102 may include the controlled voltage source 302; and in some of these other examples, the controlled voltage source 302 may be implemented by, or packaged with, the processing circuitry 112.

In some examples, the processing circuitry 112 may select a particular one of a plurality of predetermined voltages based on upstream information to be communicated to the host 202. The processing circuitry 112 may cause the controlled voltage source 302 to impose the selected particular one of the plurality of predetermined voltages on the one or more LED leads 106 of the LED controller 104, and thereby communicate the upstream information to the 202 host via the LED controller 104. In this regard, the host 202 may read the selected particular one of the plurality of predetermined voltages from the one or more LED leads 106 of the LED controller 104. In various examples, the upstream information may include information about the output signal of a sensor (peripheral 210), or the upstream information may indicate an acknowledgement of the downstream information (recovered from the PWM signal), which acknowledgement may be generated by processing circuitry 112.

Figure 6:
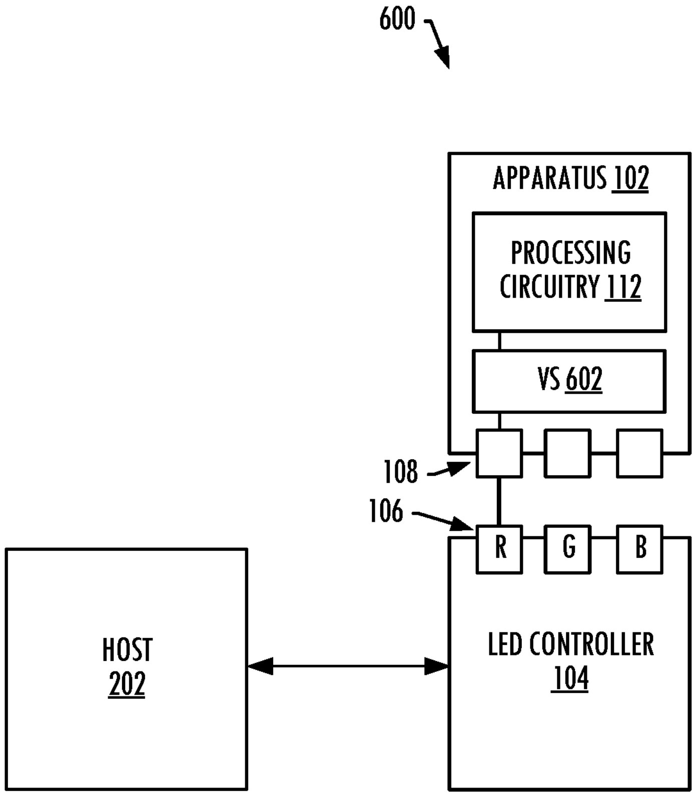
FIG. 6 illustrates a system in which the apparatus includes a controlled voltage source, according to some example implementations.

FIG. 6 illustrates a system 600 in which the apparatus 102 includes a controlled voltage source 602 to connect to one or more LED leads 106 of the LED controller 104, according to some example implementations. As explained above, in some examples, the controlled voltage source 602 may be implemented by, or packaged with, the processing circuitry 112. In other examples, the controlled voltage source 602 and processing circuitry 112 may be packaged separately and connected to one another.

According to some example implementations, the processing circuitry 112 of the apparatus 102 may select a particular one of a plurality of predetermined voltages based on upstream information to be communicated to the host 202. In this regard, respective ones of the plurality of predetermined voltages correspond to different upstream information to be communicated to the host 202. The processing circuitry 112 may then cause the controlled voltage source 602 to impose the particular one of the plurality of predetermined voltages on the one or more LED leads 106, and thereby communicate the upstream information to the host 202 via the LED controller 104. In some examples, the processing circuitry 112 may cause the controlled voltage source 602 to impose the particular one of the plurality of predetermined voltages, responsive to a predetermined current drawn through the one or more LED leads 106. The processing circuitry 112 may therefore communicate upstream to the host 202.

Figure 7:
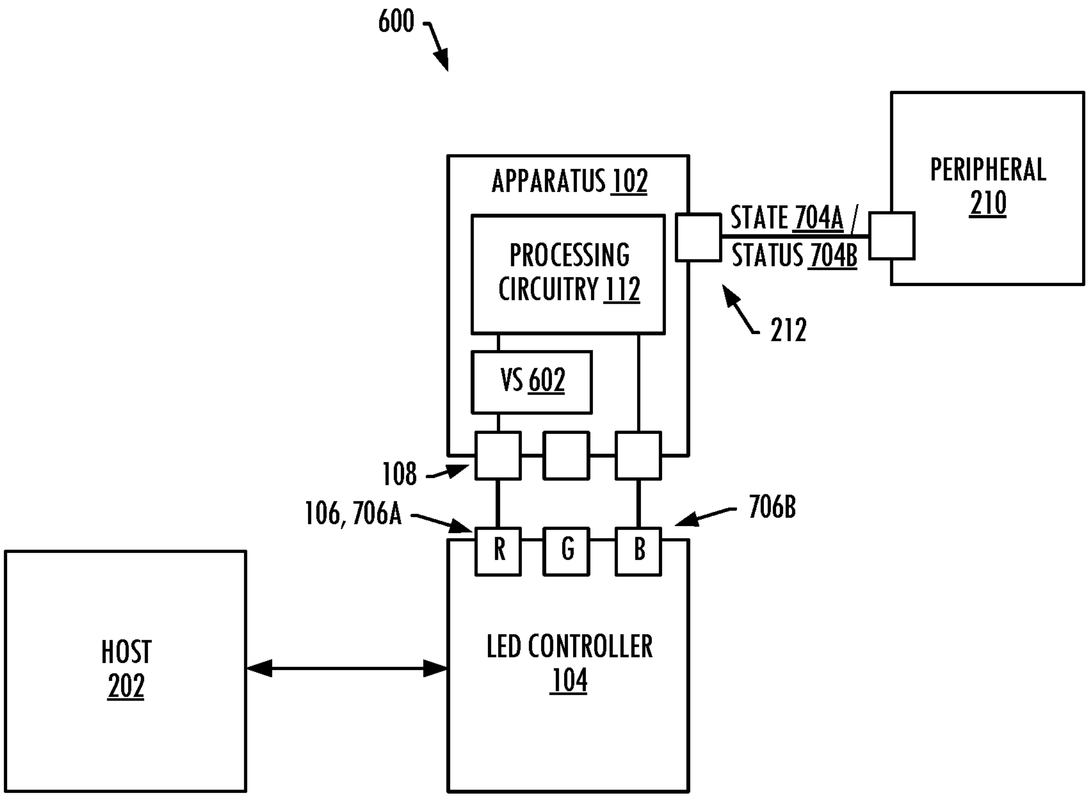
FIG. 7 illustrates the system of FIG. 6, in which the apparatus is connected to a peripheral device, according to some example implementations.
Figure 8:
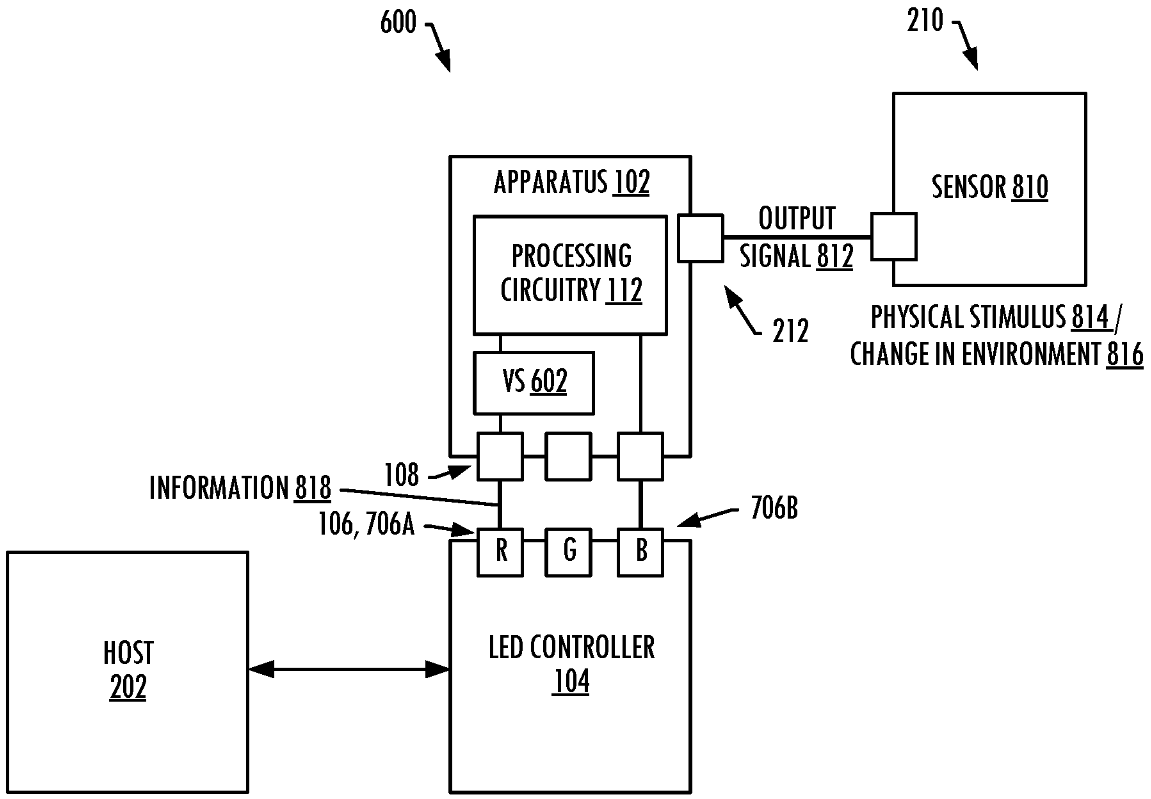
FIG. 8 illustrates the system of FIG. 7, in which the peripheral device is a sensor, according to some example implementations.

As shown in FIG. 7, in some examples in which the apparatus 102 is connected to the peripheral device 210, the upstream information to be communicated to the host 202 may include a state 704A or a status 704B of the peripheral device 210. As shown in FIG. 8, in some examples in which the peripheral device 210 is a sensor 810 to produce an output signal 812 responsive to a physical stimulus 814 or change in an environment 816 of the sensor 810, wherein the output signal reflects the physical stimulus 814 or the change in environment 816 of the sensor 810, the upstream information to be communicated to the host 202 may include information 818 about the output signal 812 produced by the sensor 810. The output signal 812 may contain information about the physical stimulus 814 or change in an environment 816 of the sensor 810, e.g., the existence of the physical stimulus 814 or an amount of physical stimulus 814, the existence of the change in the environment 816 or an amount of change in the environment 816. Information 818 may encode the information included in output signal 812.

In some examples, the processing circuitry 112 may communicate both downstream and upstream. In this regard, as shown in FIG. 6, the processing circuitry may be coupleable to the one or more LED leads 106 of the LED controller 104 via the controlled voltage source 602, which may be used either or both of the upstream and downstream. In other examples, as shown in FIGS. 7 and 8, the one or more LED leads 106 are a first one or more LED leads 706A, and the processing circuitry may be coupleable to a second one or more LED leads 706B of the LED controller 104. In these other examples, the controlled voltage source 602 may connect to the first one or more LED leads 706A for upstream communication, and the processing circuitry 112 may be coupleable to the second one or more LED leads 706B for downstream communication.

As explained above, on the downstream, the processing circuitry 112 may receive a PWM signal from the LED controller 104 via a communication link 110 that may be a downstream communication link. The processing circuitry 112 may decode the PWM signal to recover downstream information from the PWM signal, and perform an operation based on the downstream information. In examples in which the apparatus 102 communicates on both the downstream and upstream, the processing circuitry 112 may receive and decode the PWM signal to recover downstream information, and perform an operation based on the recovered downstream information. The processing circuitry may select a particular one of the plurality of predetermined voltages to transmit upstream information to the host 202, and cause the controlled voltage source 602 or 302, to impose the particular one of the plurality of predetermined voltages on the one or more LED leads 106 to transmit upstream information to the host 202. The processing circuitry 112 may select (and cause the controlled voltage source 302, 602 to impose) the particular one of the plurality of predetermined voltages in a number of different manners, such as those described above. In one example, the upstream information may be transmitted as a response to the recovered downstream information, i.e., the upstream information transmission may be considered an operation to be performed in response to the recovered downstream information.

Figure 9:
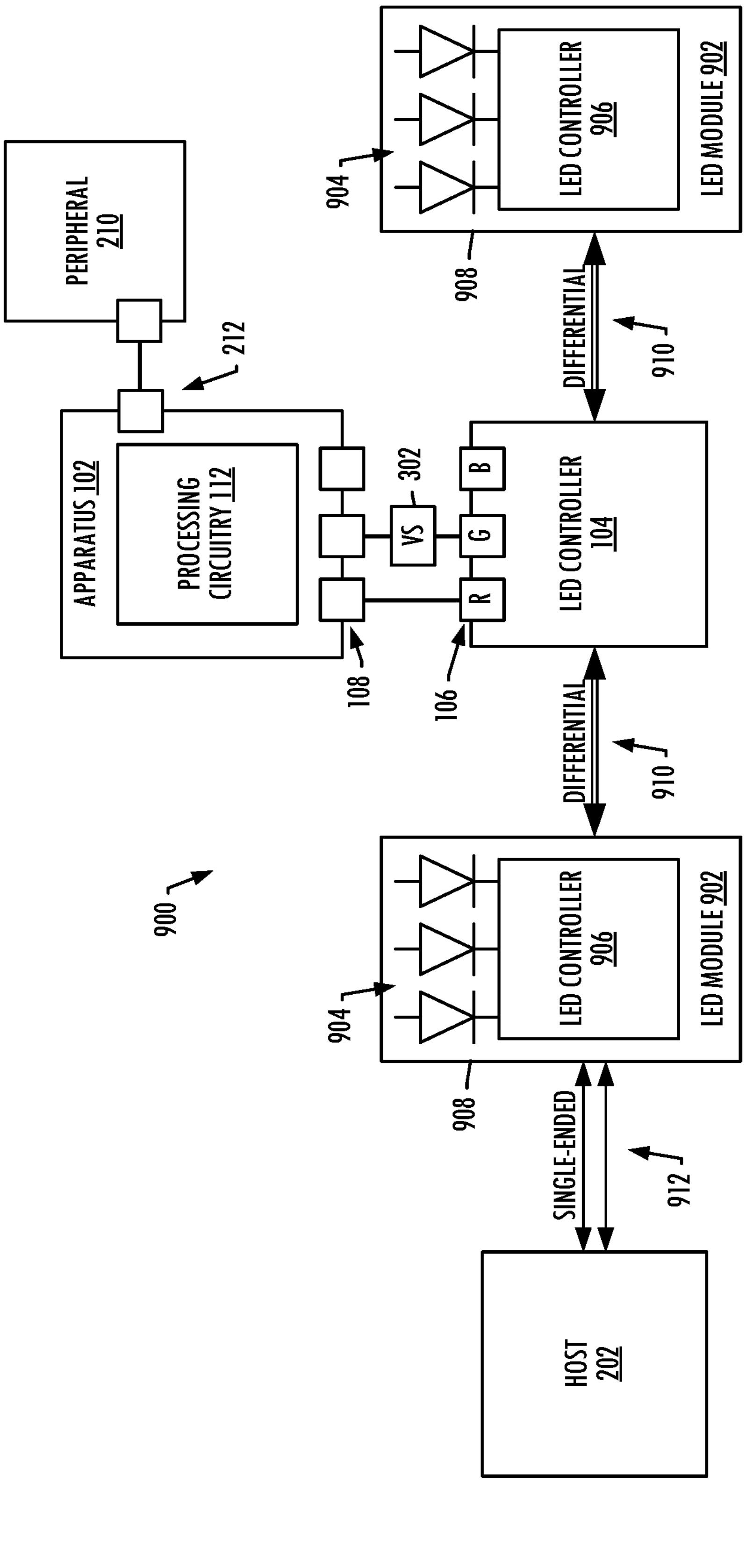
FIG. 9 illustrates a system that comprises a network including a host and a plurality of clients including the LED controller that is connected to the apparatus, according to some example implementations.

FIG. 9 illustrates a system 900 that comprises a network including a host 202 and a plurality of clients including the LED controller 104 that is connected to the apparatus 102, with or without a peripheral device 210 and/or controlled voltage source 302, 602. In some examples, the plurality of clients may be connected in series. In addition to the LED controller 104 connected to the apparatus, the clients may include one or more LED modules 902. As shown, respective ones of the one or more LED modules 902 may be a system-in-package including a respective one or more LEDs 904 (e.g., red, green, blue (RGB) LEDs), a respective LED controller 906, and a package 908 in which the respective one or more LEDs and the respective LED controller are enclosed. Similar to the LED controller 104, the respective LED controller 906 of the LED module 908 may include an LED driver and a controller. One example of a suitable LED driver and controller is the model INLC100D ISELED device, available from Inova Semiconductors.

As also shown, in some examples, adjacent ones of the plurality of clients are connected to one another by differential serial communication lines 910. The host 202 may be connected to one of the plurality of clients by single-ended or differential serial communication lines 912.

The clients of the system 900 may be connected in series in a number of different orders. The LED controller 104 and thereby the apparatus 102 may be connected closer to or farther away from the host 202, with or without one or more LED modules 902 connected between the host 202 and the LED controller 104, and with or without one or more LED modules 902 connected opposite the LED controller 104 from the host 202. Likewise, in some examples, the system 900 may comprise multiple ones of the LED controller 104 and apparatus 102 (respective ones of the multiple apparatus 102 with or without a peripheral device 210 and/or controlled voltage source 302, 602).

Figure 10:
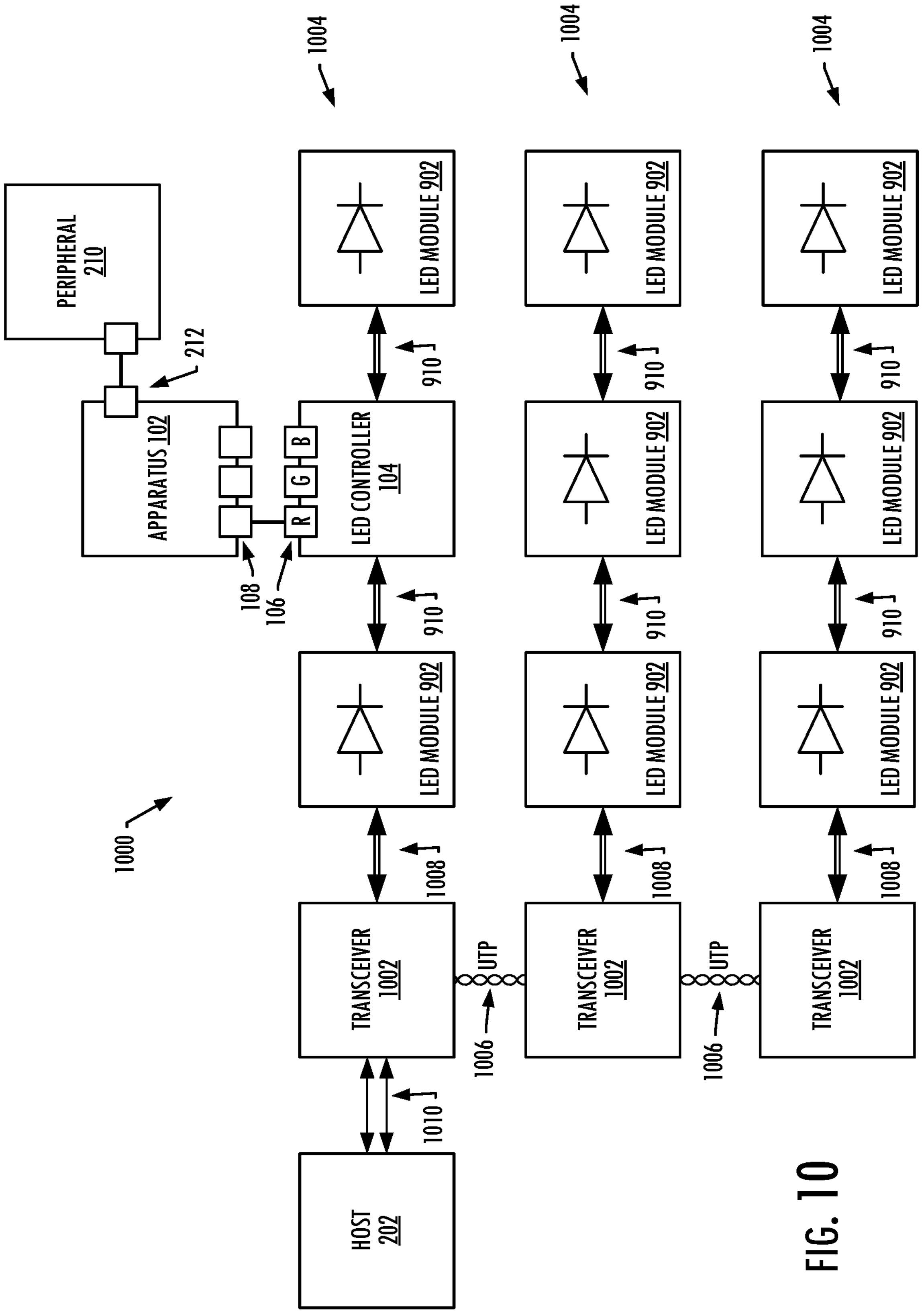
FIG. 10 illustrates a system that may extend the system of FIG. 9 to include a plurality of transceivers to interconnect subsets of clients, according to some example implementations.

FIG. 10 illustrates a system 1000 that may extend the system 900 of FIG. 9 to include a plurality of transceivers 1002 to interconnect subsets of clients, according to some example implementations. The network in some of these examples may be an ILaS (ISELED Light and Sensor) network. As shown, the plurality of transceivers 1002 may be connected to respective subsets 1004 of the plurality of clients, the plurality of transceivers 1002 connected to one another by unshielded twisted pair cables 1006. Similar to adjacent ones of the clients, respective ones of the plurality of transceivers 1002 may be connected to one of the clients of one of the respective subsets of the plurality of clients by single-ended or differential serial communication lines 1008. The host 202 may be connected to one of the plurality of transceivers 1002 by single-ended serial communication lines 1010. The network 1000 in some of these examples may be a ILaS (ISELED Light and Sensor) network. One example of a suitable transceiver is the model INLT220Q ILaS transceiver, available from Inova Semiconductors.

Similar to the system 900, clients of the system 1000 may be connected in series in a number of different orders. Likewise, one or more of the respective subsets 1004 of the plurality of clients may include one or more LED controllers 104 with one or more apparatuses 102 (with or without peripheral devices 210 and/or controlled voltage sources 302, 602).

Figure 11:
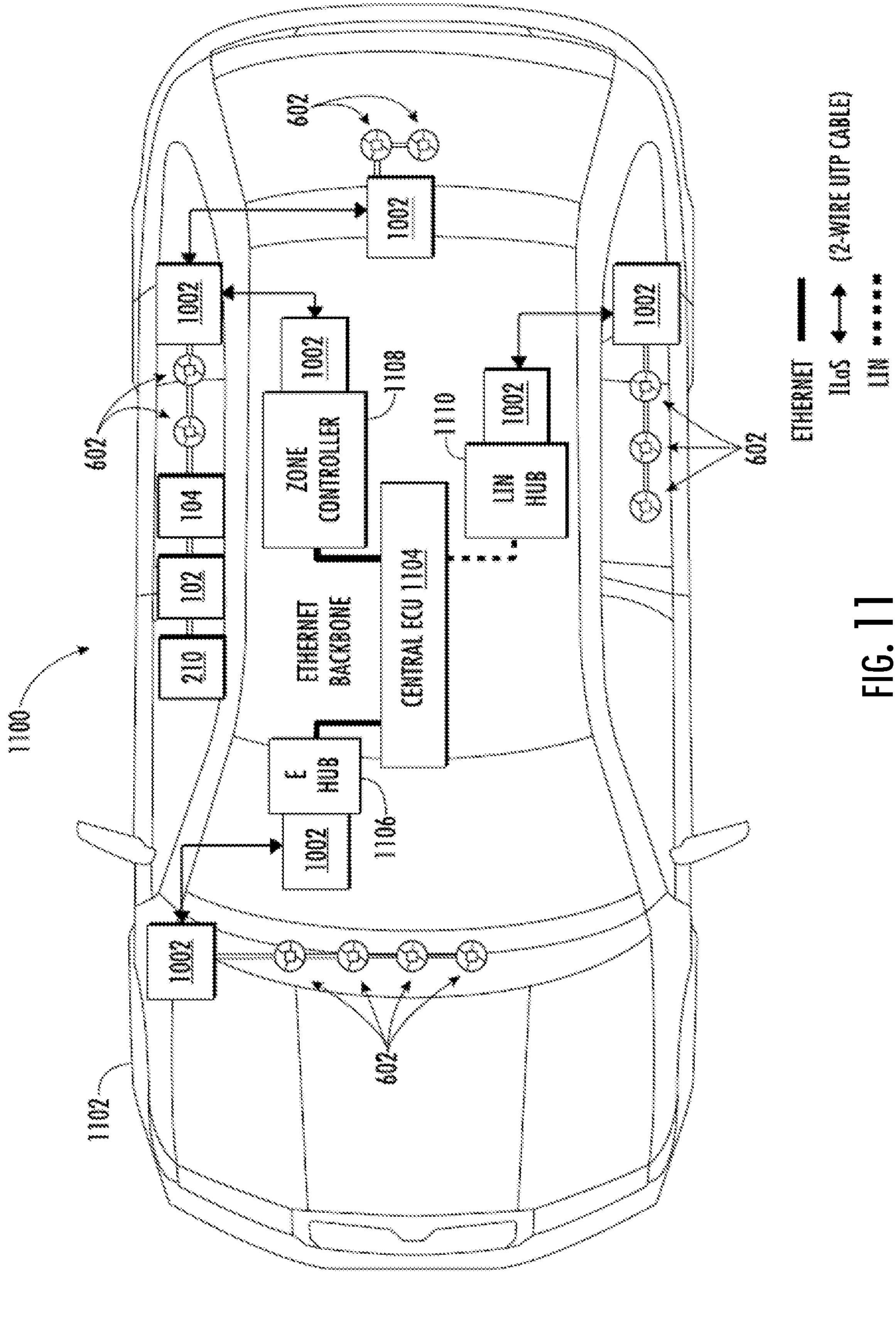
FIG. 11 illustrates a more specific example of a ILaS (ISELED Light and Sensor) network deployed onboard a vehicle, and that may include the system of some example implementations.

FIG. 11 illustrates a more specific example of a ILaS network 1100 deployed onboard a vehicle 1102, and that may include the system 1000 of some example implementations. The ILaS includes a central electronic control unit (ECU) 1104 that may be connected through an Ethernet backbone to an Ethernet hub (E hub) 1106 and to a zone controller 1108, and that may be connected by a local interconnect network (LIN) connection to a LIN hub 1110. The Ethernet hub 1106, zone controller 1108 and LIN hub 1110 may be connected to respective transceivers 1002. The respective transceivers 1002 may be connected to respective subsets 1004 of a plurality of clients, as described above with respect to the system 1000 of FIG. 10. The central ECU 1104 may function as a host similar to host 202. The Ethernet hub 1106 may connect the central ECU 1104 to one or more of the respective transceivers 1002 by the Ethernet backbone. The zone controller 1108 may distribute host communication to and from a zone distributed (sub) architecture. The LIN hub 1110 may connect the central ECU 1104 to one or more of the respective transceivers 1002 by a local area network.

FIGS. 12A-12K are flowcharts illustrating various steps in a method 1200, according to various example implementations. The method includes receiving a pulse-width modulation (PWM) signal at an apparatus from a light-emitting diode (LED) controller, the apparatus including one or more leads to connect the apparatus to one or more LED leads of the LED controller, as shown at block 1202 of FIG. 12A. The method includes decoding the PWM signal to recover downstream information from the PWM signal, as shown at block 1204. The method also includes performing an operation based on the downstream information, as shown at block 1206.

Figure 12A:
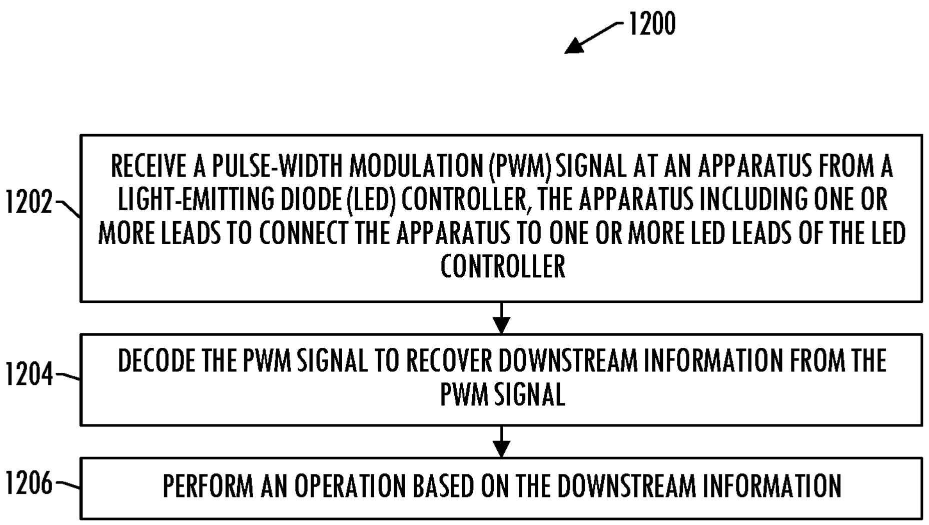
FIGS. 12A, 12B, 12C, 12D, 12E, 12F, 12G, 12H, 12I, 12J and 12K are flowcharts illustrating various operations in a method for downstream communication, according to example implementations.
Figure 12B:
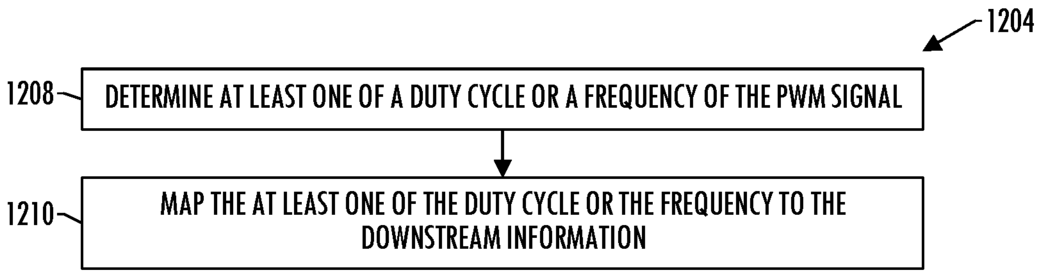
Figure 12C:

In some examples, decoding the PWM signal at block 1204 includes determining at least one of a duty cycle or a frequency of the PWM signal, as shown at block 1208 of FIG. 12B. In some of these examples, decoding the PWM signal also includes mapping the at least one of the duty cycle or the frequency to the downstream information, as shown at block 1210.

In some examples, the apparatus is connected to a peripheral device that is external to the apparatus. In some of these examples, performing the operation at block 1206 includes interacting with the peripheral device based on the downstream information, as shown at block 1212 of FIG. 12C.

Figure 12D:

In some examples, interacting with the peripheral device at block 1212 includes performing a configuration or calibration of the peripheral device, as shown at block 1214 of FIG. 12D.

Figure 12E:

In some examples, interacting with the peripheral device at block 1212 includes performing a firmware update of the peripheral device, as shown at block 1216 of FIG. 12E.

Figure 12F:

In some examples, the peripheral device includes an LED, and interacting with the peripheral device at block 1212 includes controlling the LED to emit light, as shown at block 1218 of FIG. 12F.

Figure 12G:
Figure 12H:

In some examples, the peripheral device includes an actuator to produce a motion, and interacting with the peripheral device at block 1212 includes controlling the actuator to produce the motion, as shown at block 1220 of FIG. 12G.

In some examples, the peripheral device includes a sensor to produce an output signal responsive to a physical stimulus or change in an environment of the sensor. In some of these examples, interacting with the peripheral device at block 1212 includes reading the output signal from the sensor, as shown at block 1222 of FIG. 12H.

Figure 12I:
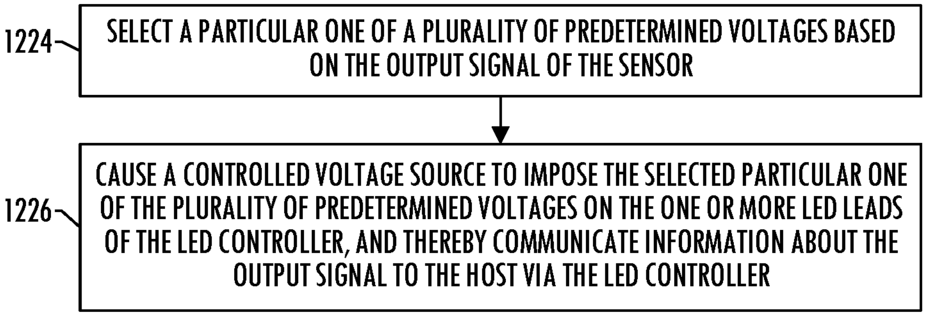

In some examples, the LED controller is in communication with a host and the method 1200 includes selecting a particular one of a plurality of predetermined voltages based on the output signal of the sensor, as shown at block 1224 of FIG. 12I. In some of these examples, the method also includes causing a controlled voltage source to impose the selected particular one of the plurality of predetermined voltages on the one or more LED leads of the LED controller, and thereby communicate information about the output signal to the host via the LED controller, as shown at block 1226.

Figure 12J:
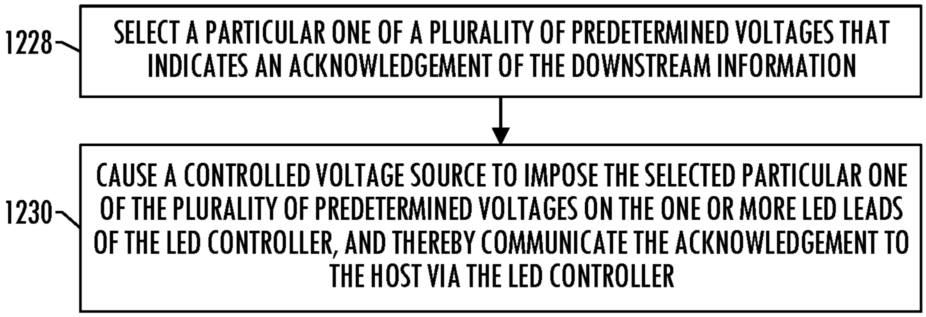

In some examples in which the LED controller is in communication with a host, and the method 1200 includes selecting a particular one of a plurality of predetermined voltages that indicates an acknowledgement of the downstream information, as shown at block 1228 of FIG. 12J. In some of these examples, the method includes causing a controlled voltage source to impose the selected particular one of the plurality of predetermined voltages on the one or more LED leads of the LED controller, and thereby communicate the acknowledgement to the host via the LED controller, as shown at block 1230.

Figure 12K:
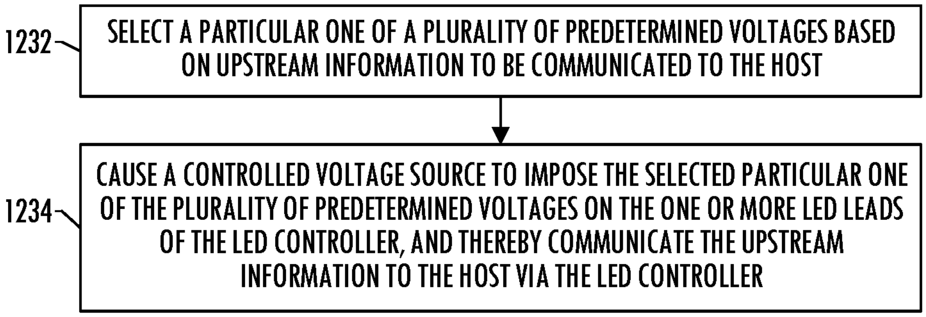

In some examples in which the LED controller is in communication with a host, the method 1200 includes selecting a particular one of a plurality of predetermined voltages based on upstream information to be communicated to the host, as shown at block 1232 of FIG. 12K. In some of these examples, the method includes causing a controlled voltage source to impose the selected particular one of the plurality of predetermined voltages on the one or more LED leads of the LED controller, and thereby communicate the upstream information to the host via the LED controller, as shown at block 1234.

In some examples, at least one of the one or more leads of the apparatus is to connect the apparatus to the controlled voltage source that is connected to at least one of the one or more LED leads of the LED controller.

Figure 13A:
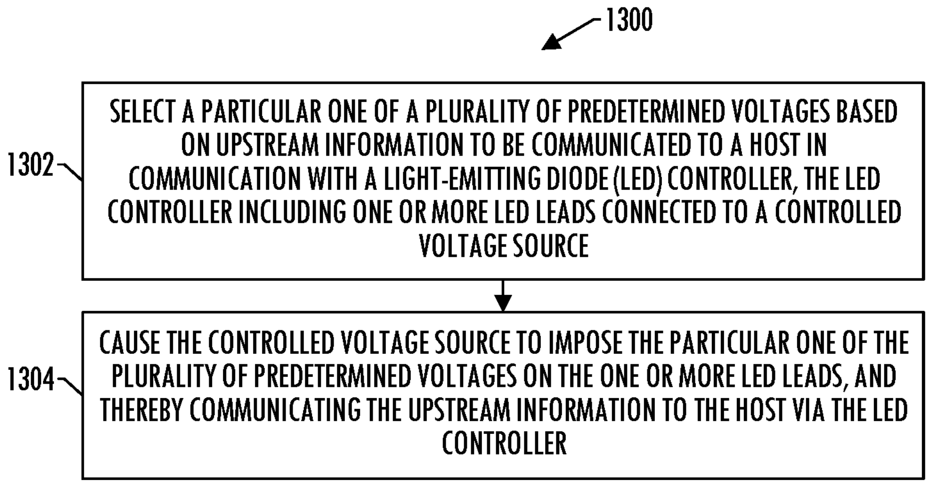
FIGS. 13A, 13B and 13C are flowcharts illustrating various operations in a method for upstream communication, according to other example implementations.
Figure 13B:
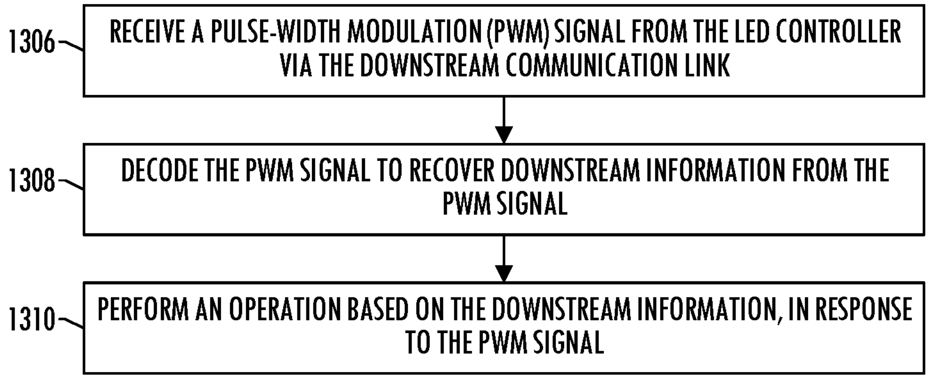
Figure 13C:
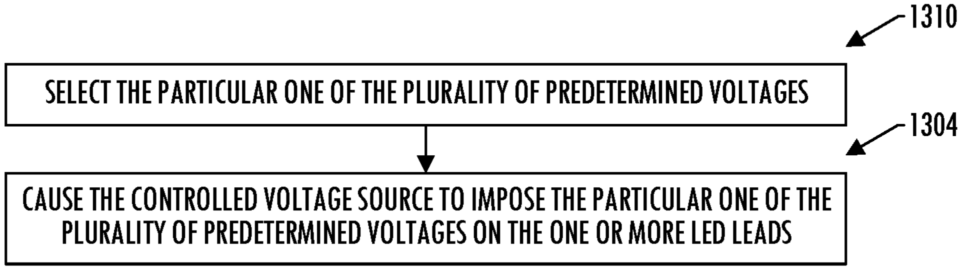

FIGS. 13A-13C are flowcharts illustrating various steps in a method 1300, according to various example implementations. The method includes selecting a particular one of a plurality of predetermined voltages based on upstream information to be communicated to a host in communication with a light-emitting diode (LED) controller, the LED controller including one or more LED leads connected to a controlled voltage source, as shown at block 1302 of FIG. 13A. The method also includes causing the controlled voltage source to impose the particular one of the plurality of predetermined voltages on the one or more LED leads, and thereby communicating the upstream information to the host via the LED controller, as shown at block 1304.

In some examples, the controlled voltage source is caused to impose the particular one of the plurality of predetermined voltages at block 1304, responsive to a predetermined current drawn through the one or more LED leads.

In some examples, respective ones of the plurality of predetermined voltages correspond to different upstream information to be communicated to the host.

In some examples, the controlled voltage source is implemented as a digital-to-analog converter (DAC) to impose the particular one of the plurality of predetermined voltages on the one or more LED leads.

In some examples, the controlled voltage source is implemented as a resistor ladder to impose the particular one of the plurality of predetermined voltages on the one or more LED leads.

In some examples, the method is performed at an apparatus connected to a peripheral device that is external to the apparatus, and the upstream information to be communicated to the host includes a state or a status of the peripheral device.

In some examples, the method is performed at an apparatus connected to a sensor to produce an output signal responsive to a physical stimulus or change in an environment of the sensor, and the upstream information to be communicated to the host includes information about the output signal.

In some examples, the method is performed at an apparatus including processing circuitry coupled with the LED controller to establish a downstream communication link between the processing circuitry and the LED controller.

In some examples, the processing circuitry is coupled with the one or more LED leads of the LED controller via the controlled voltage source.

In some examples, the one or more LED leads are a first one or more LEDs, and the LED controller includes the first one or more LED leads and a second one or more LED leads. In some of these examples, the processing circuitry is coupled with the second one or more LED leads of the LED controller.

In some examples, the method 1300 includes the processing circuitry receiving a pulse-width modulation (PWM) signal from the LED controller via the downstream communication link, as shown at block 1306 of FIG. 13B. In some of these examples, the method includes decoding the PWM signal to recover downstream information from the PWM signal, as shown at block 1308.

And the method includes performing an operation based on the downstream information, as shown at block 1310.

In some examples, the processing circuitry performing the operation at block 1310 includes the processing circuitry selecting the particular one of the plurality of predetermined voltages, as shown at block 1310 of FIG. 13C. In some of these examples, the controlled voltage source is then caused to impose the particular one of the plurality of predetermined voltages on the one or more LED leads, as shown at block 1304 of FIG. 13C.

As explained above and reiterated below, the present disclosure includes, without limitation, the following example implementations.

Clause 1. An apparatus comprising: one or more leads to connect the apparatus to one or more light-emitting diode (LED) leads of an LED controller; and processing circuitry to: receive a pulse-width modulation (PWM) signal from the LED controller; decode the PWM signal to recover downstream information from the PWM signal; and perform an operation based on the downstream information.

Clause 2. The apparatus of clause 1, wherein the processing circuitry to decode the PWM signal includes the processing circuitry to: determine at least one of a duty cycle or a frequency of the PWM signal; and map the at least one of the duty cycle or the frequency to the downstream information.

Clause 3. The apparatus of clause 1 or clause 2, wherein the apparatus is to connect to a peripheral device that is external to the apparatus, and wherein processing circuitry to perform the operation includes the processing circuitry to interact with the peripheral device based on the downstream information.

Clause 4. The apparatus of clause 3, wherein the processing circuitry to interact with the peripheral device includes the processing circuitry to perform a configuration or calibration of the peripheral device.

Clause 5. The apparatus of clause 3 or clause 4, wherein the processing circuitry to interact with the peripheral device includes the processing circuitry to perform a firmware update of the peripheral device.

Clause 6. The apparatus of any of clauses 3 to 5, wherein the peripheral device includes an LED, and wherein the processing circuitry to interact with the peripheral device includes the processing circuitry to control the LED to emit light.

Clause 7. The apparatus of any of clauses 3 to 6, wherein the peripheral device includes an actuator to produce a motion, and wherein the processing circuitry to interact with the peripheral device includes the processing circuitry to control the actuator to produce the motion.

Clause 8. The apparatus of any of clauses 3 to 7, wherein the peripheral device includes a sensor to produce an output signal responsive to a physical stimulus or change in an environment of the sensor, and wherein the processing circuitry to interact with the peripheral device includes the processing circuitry to read the output signal from the sensor.

Clause 9. The apparatus of clause 8, wherein the LED controller is in communication with a host, and the processing circuitry is to: select a particular one of a plurality of predetermined voltages based on the output signal of the sensor; and cause a controlled voltage source to impose the selected particular one of the plurality of predetermined voltages on the one or more LED leads of the LED controller, and thereby communicate information about the output signal to the host via the LED controller.

Clause 10. The apparatus of any of clauses 1 to 9, wherein the LED controller is in communication with a host, and the processing circuitry is to: select a particular one of a plurality of predetermined voltages that indicates an acknowledgement of the downstream information; and cause a controlled voltage source to impose the selected particular one of the plurality of predetermined voltages on the one or more LED leads of the LED controller, and thereby communicate the acknowledgement to the host via the LED controller.

Clause 11. The apparatus of any of clauses 1 to 10, wherein the LED controller is in communication with a host, and the processing circuitry is to: select a particular one of a plurality of predetermined voltages based on upstream information to be communicated to the host; and cause a controlled voltage source to impose the selected particular one of the plurality of predetermined voltages on the one or more LED leads of the LED controller, and thereby communicate the upstream information to the host via the LED controller.

Clause 12. The apparatus of clause 11, wherein at least one of the one or more leads of the apparatus is to connect the apparatus to the controlled voltage source that is connected to at least one of the one or more LED leads of the LED controller.

Clause 13. A method comprising: receiving a pulse-width modulation (PWM) signal at an apparatus from a light-emitting diode (LED) controller, the apparatus including one or more leads to connect the apparatus to one or more LED leads of the LED controller; decoding the PWM signal to recover downstream information from the PWM signal; and performing an operation based on the downstream information.

Clause 14. The method of clause 13, wherein decoding the PWM signal includes: determining at least one of a duty cycle or a frequency of the PWM signal; and mapping the at least one of the duty cycle or the frequency to the downstream information.

Clause 15. The method of clause 13 or clause 14, wherein the apparatus is connected to a peripheral device that is external to the apparatus, and wherein performing the operation includes interacting with the peripheral device based on the downstream information.

Clause 16. The method of clause 15, wherein interacting with the peripheral device includes performing a configuration or calibration of the peripheral device.

Clause 17. The method of clause 15 or clause 16, wherein interacting with the peripheral device includes performing a firmware update of the peripheral device.

Clause 18. The method of any of clauses 15 to 17, wherein the peripheral device includes an LED, and wherein interacting with the peripheral device includes controlling the LED to emit light.

Clause 19. The method of any of clauses 15 to 18, wherein the peripheral device includes an actuator to produce a motion, and wherein interacting with the peripheral device includes controlling the actuator to produce the motion.

Clause 20. The method of any of clauses 15 to 19, wherein the peripheral device includes a sensor to produce an output signal responsive to a physical stimulus or change in an environment of the sensor, and wherein interacting with the peripheral device includes reading the output signal from the sensor.

Clause 21. The method of clause 20, wherein the LED controller is in communication with a host, and the method comprises: selecting a particular one of a plurality of predetermined voltages based on the output signal of the sensor; and causing a controlled voltage source to impose the selected particular one of the plurality of predetermined voltages on the one or more LED leads of the LED controller, and thereby communicate information about the output signal to the host via the LED controller.

Clause 22. The method of any of clauses 13 to 21, wherein the LED controller is in communication with a host, and the method comprises: selecting a particular one of a plurality of predetermined voltages that indicates an acknowledgement of the downstream information; and causing a controlled voltage source to impose the selected particular one of the plurality of predetermined voltages on the one or more LED leads of the LED controller, and thereby communicate the acknowledgement to the host via the LED controller.

Clause 23. The method of any of clauses 13 to 22, wherein the LED controller is in communication with a host, and the method comprises: selecting a particular one of a plurality of predetermined voltages based on upstream information to be communicated to the host; and causing a controlled voltage source to impose the selected particular one of the plurality of predetermined voltages on the one or more LED leads of the LED controller, and thereby communicate the upstream information to the host via the LED controller.

Clause 24. The method of clause 23, wherein at least one of the one or more leads of the apparatus is to connect the apparatus to the controlled voltage source that is connected to at least one of the one or more LED leads of the LED controller.

Clause 25. An apparatus comprising: a controlled voltage source to connect to one or more light-emitting diode (LED) leads of a light-emitting diode (LED) controller that is in communication with a host; and processing circuitry to: select a particular one of a plurality of predetermined voltages based on upstream information to be communicated to the host; and cause the controlled voltage source to impose the particular one of the plurality of predetermined voltages on the one or more LED leads, and thereby communicate the upstream information to the host via the LED controller.

Clause 26. The apparatus of clause 25, wherein the processing circuitry is to cause the controlled voltage source to impose the particular one of the plurality of predetermined voltages, responsive to a predetermined current drawn through the one or more LED leads.

Clause 27. The apparatus of clause 25 or clause 26, wherein respective ones of the plurality of predetermined voltages correspond to different upstream information to be communicated to the host.

Clause 28. The apparatus of any of clauses 25 to 27, wherein the controlled voltage source is implemented as a digital-to-analog converter (DAC).

Clause 29. The apparatus of any of clauses 25 to 28, wherein the controlled voltage source is implemented as a resistor ladder.

Clause 30. The apparatus of any of clauses 25 to 29, wherein the apparatus is to connect to a peripheral device that is external to the apparatus, and the upstream information to be communicated to the host includes a state or a status of the peripheral device.

Clause 31. The apparatus of any of clauses 25 to 30, wherein the apparatus is to connect to a sensor to produce an output signal responsive to a physical stimulus or change in an environment of the sensor, and the upstream information to be communicated to the host includes information about the output signal.

Clause 32. The apparatus of any of clauses 25 to 31, wherein the processing circuitry is coupleable with the LED controller to establish a downstream communication link between the processing circuitry and the LED controller.

Clause 33. The apparatus of clause 32, wherein the processing circuitry is coupleable with the one or more LED leads of the LED controller via the controlled voltage source.

Clause 34. The apparatus of clause 32 or clause 33, wherein the one or more LED leads are a first one or more LEDs, and the LED controller includes the first one or more LED leads and a second one or more LED leads, and wherein the processing circuitry is coupleable with the second one or more LED leads of the LED controller.

Clause 35. The apparatus of any of clauses 32 to 34, wherein the processing circuitry is to: receive a pulse-width modulation (PWM) signal from the LED controller via the downstream communication link; decode the PWM signal to recover downstream information from the PWM signal; and perform an operation based on the downstream information.

Clause 36. The apparatus of clause 35, wherein the processing circuitry to perform the operation includes the processing circuitry to select the particular one of the plurality of predetermined voltages, and cause the controlled voltage source to impose the particular one of the plurality of predetermined voltages on the one or more LED leads.

Clause 37. A method comprising: selecting a particular one of a plurality of predetermined voltages based on upstream information to be communicated to a host in communication with a light-emitting diode (LED) controller, the LED controller including one or more LED leads connected to a controlled voltage source; and causing the controlled voltage source to impose the particular one of the plurality of predetermined voltages on the one or more LED leads, and thereby communicating the upstream information to the host via the LED controller.

Clause 38. The method of clause 37, wherein the controlled voltage source is caused to impose the particular one of the plurality of predetermined voltages, responsive to a predetermined current drawn through the one or more LED leads.

Clause 39. The method of clause 37 or clause 38, wherein respective ones of the plurality of predetermined voltages correspond to different upstream information to be communicated to the host.

Clause 40. The method of any of clauses 37 to 39, wherein the controlled voltage source is implemented as a digital-to-analog converter (DAC) to impose the particular one of the plurality of predetermined voltages on the one or more LED leads.

Clause 41. The method of any of clauses 37 to 40, wherein the controlled voltage source is implemented as a resistor ladder to impose the particular one of the plurality of predetermined voltages on the one or more LED leads.

Clause 42. The method of any of clauses 37 to 41, wherein the method is performed at an apparatus connected to a peripheral device that is external to the apparatus, and the upstream information to be communicated to the host includes a state or a status of the peripheral device.

Clause 43. The method of any of clauses 37 to 42, wherein the method is performed at an apparatus connected to a sensor to produce an output signal responsive to a physical stimulus or change in an environment of the sensor, and the upstream information to be communicated to the host includes information about the output signal.

Clause 44. The method of any of clauses 37 to 43, wherein the method is performed at an apparatus including processing circuitry coupled with the LED controller to establish a downstream communication link between the processing circuitry and the LED controller.

Clause 45. The method of clause 44, wherein the processing circuitry is coupled with the one or more LED leads of the LED controller via the controlled voltage source.

Clause 46. The method of clause 44 or clause 45, wherein the one or more LED leads are a first one or more LEDs, and the LED controller includes the first one or more LED leads and a second one or more LED leads, and wherein the processing circuitry is coupled with the second one or more LED leads of the LED controller.

Clause 47. The method of any of clauses 44 to 46, wherein the method comprises the processing circuitry: receiving a pulse-width modulation (PWM) signal from the LED controller via the downstream communication link; decoding the PWM signal to recover downstream information from the PWM signal; and performing an operation based on the downstream information.

Clause 48. The method of clause 47, wherein the processing circuitry performing the operation includes the processing circuitry selecting the particular one of the plurality of predetermined voltages, and causing the controlled voltage source to impose the particular one of the plurality of predetermined voltages on the one or more LED leads.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising:

a controlled voltage source to connect to one or more light-emitting diode (LED) leads of a light-emitting diode (LED) controller that is external to the apparatus and is in communication with a host; and processing circuitry to:

select a particular one of a plurality of predetermined voltages based on upstream information to be communicated to the host; and cause the controlled voltage source to impose the particular one of the plurality of predetermined voltages on the one or more LED leads, and thereby communicate the upstream information to the host via the LED controller, wherein the apparatus is connected to a peripheral device that is external to the apparatus, the upstream information to be communicated to the host includes a state or a status of the peripheral device, and the upstream information is communicated from the peripheral device to the apparatus, from the apparatus to the LED controller, and from the LED controller to the host.

2. The apparatus of claim 1, wherein the processing circuitry is to cause the controlled voltage source to impose the particular one of the plurality of predetermined voltages, responsive to a predetermined current drawn through the one or more LED leads.

3. The apparatus of claim 1, wherein respective ones of the plurality of predetermined voltages correspond to different upstream information to be communicated to the host.

4. The apparatus of claim 1, wherein the controlled voltage source is implemented as a digital-to-analog converter (DAC).

5. The apparatus of claim 1, wherein the controlled voltage source is implemented as a resistor ladder.

6. The apparatus of claim 1, wherein the peripheral device is a sensor to produce an output signal responsive to a physical stimulus or change in an environment of the sensor and the upstream information to be communicated to the host includes information about the output signal.

7. The apparatus of claim 1, wherein the processing circuitry is coupled with the LED controller to establish a downstream communication link between the processing circuitry and the LED controller.

8. The apparatus of claim 7, wherein the processing circuitry and the controlled voltage source are packaged separately, one or more leads of the apparatus couple the processing circuitry to the controlled voltage source, and the controlled voltage source is coupled with the one or more LED leads of the LED controller.

9. The apparatus of claim 7, wherein the one or more LED leads are a first one or more LEDs, and the LED controller includes the first one or more LED leads and a second one or more LED leads, and wherein the processing circuitry is coupled with the second one or more LED leads of the LED controller.

10. The apparatus of claim 7, wherein the processing circuitry is to:

receive a pulse-width modulation (PWM) signal from the LED controller via the downstream communication link;

decode the PWM signal to recover downstream information from the PWM signal, wherein to decode the PWM signal the processing circuitry determines at least one of a duty cycle and a frequency, and maps at least one of the duty cycle and the frequency to the downstream information; and perform an operation based on the downstream information.

11. The apparatus of claim 10, wherein the processing circuitry to perform the operation includes the processing circuitry to select the particular one of the plurality of predetermined voltages, and cause the controlled voltage source to impose the particular one of the plurality of predetermined voltages on the one or more LED leads.

12. A method comprising:

selecting a particular one of a plurality of predetermined voltages based on upstream information to be communicated to a host in communication with a light-emitting diode (LED) controller, the LED controller including one or more LED leads external to and connected to a controlled voltage source; and causing the controlled voltage source to impose the particular one of the plurality of predetermined voltages on the one or more LED leads, and thereby communicating the upstream information to the host via the LED controller, wherein the method is performed at an apparatus connected to a peripheral device that is external to the apparatus, the upstream information to be communicated to the host includes a state or a status of the peripheral device, and the upstream information is communicated from the peripheral device to the apparatus, from the apparatus to the LED controller, and from the LED controller to the host.

13. The method of claim 12, wherein the controlled voltage source is caused to impose the particular one of the plurality of predetermined voltages, responsive to a predetermined current drawn through the one or more LED leads.

14. The method of claim 12, wherein respective ones of the plurality of predetermined voltages correspond to different upstream information to be communicated to the host.

15. The method of claim 12, wherein the controlled voltage source is implemented as a digital-to-analog converter (DAC) to impose the particular one of the plurality of predetermined voltages on the one or more LED leads.

16. The method of claim 12, wherein the controlled voltage source is implemented as a resistor ladder to impose the particular one of the plurality of predetermined voltages on the one or more LED leads.

17. The method of claim 12, wherein the peripheral device is a sensor to produce an output signal responsive to a physical stimulus or change in an environment of the sensor and the upstream information to be communicated to the host includes information about the output signal.

18. The method of claim 12, wherein the method is performed at the apparatus including processing circuitry coupled with the LED controller to establish a downstream communication link between the processing circuitry and the LED controller.

19. The method of claim 18, wherein the processing circuitry and the controlled voltage source are packaged separately, one or more leads of the apparatus couple the processing circuitry to the controlled voltage source, and the controlled voltage source is coupled with the one or more LED leads of the LED controller.

20. The method of claim 18, wherein the one or more LED leads are a first one or more LEDs, and the LED controller includes the first one or more LED leads and a second one or more LED leads, and wherein the processing circuitry is coupled with the second one or more LED leads of the LED controller.

21. The method of claim 18, wherein the method comprises the processing circuitry:

receiving a pulse-width modulation (PWM) signal from the LED controller via the downstream communication link;

decoding the PWM signal to recover downstream information from the PWM signal, comprising the processing circuitry determining at least one of a duty cycle and a frequency, and mapping at least one of the duty cycle and the frequency to the downstream information; and performing an operation based on the downstream information.

22. The method of claim 21, wherein the processing circuitry performing the operation includes the processing circuitry selecting the particular one of the plurality of predetermined voltages, and causing the controlled voltage source to impose the particular one of the plurality of predetermined voltages on the one or more LED leads.

* * * * *